US012752223B2

(12) United States Patent
Li et al.

(10) Patent No.: US 12,752,223 B2
(45) Date of Patent: Oct. 6, 2026

(54) METHOD FOR ADJUSTING GROUTING PARAMETERS IN PREPARATION OF CERAMIC COMPOSITE FIBER-BASED CATALYTIC FILTER TUBE, AND METHOD AND DEVICE FOR PREPARING CERAMIC COMPOSITE FIBER-BASED CATALYTIC FILTER TUBE

(71) Applicant: Zhejiang Zhiyuan Environmental Technology Co., Ltd, Jiaxing (CN)

(72) Inventors: Huilin Li, Jiaxing (CN); Qiqi Chu, Jiaxing (CN); Guogan Deng, Jiaxing (CN); Kanli Shen, Jiaxing (CN); Qiang Shen, Jiaxing (CN); Jinhua Zhu, Jiaxing (CN); Yangzhou He, Jiaxing (CN)

(73) Assignee: ZHEJIANG ZHIYUAN ENVIRONMENTAL TECHNOLOGY CO., LTD., Jiaxing (CN)

( * ) Notice: Subject to any disclaimer, the term of this patent is extended or adjusted under 35 U.S.C. 154(b) by 744 days.

(21) Appl. No.: 18/030,424

(22) PCT Filed: Oct. 26, 2021

(86) PCT No.: PCT/CN2021/126377

§ 371 (c)(1),
(2) Date: Apr. 5, 2023

(87) PCT Pub. No.: WO2023/284158

PCT Pub. Date: Jan. 19, 2023

(65) Prior Publication Data

US 2023/0381699 A1 Nov. 30, 2023

(30) Foreign Application Priority Data

Jul. 12, 2021 (CN) ......................... 202110783435.8

(51) Int. Cl.
*B01D 39/20* (2006.01)
*B01D 46/00* (2022.01)
(Continued)

(52) U.S. Cl.
CPC ..... *B01D 39/2082* (2013.01); *B01D 46/0001* (2013.01); *B01D 46/0027* (2013.01);
(Continued)

(58) Field of Classification Search
CPC ............ B01D 39/2082; B01D 39/2068; B01D 39/2075; B01D 46/2403; B01F 35/7176
See application file for complete search history.

(56) References Cited

U.S. PATENT DOCUMENTS

2018/0008964 A1* 1/2018 Castellino ............... F01N 3/035

FOREIGN PATENT DOCUMENTS

CA 2003070 A1 * 5/1991
CN 101864966 A 10/2010
(Continued)

OTHER PUBLICATIONS

ISR/WO issued for International Application No. PCT/CN2021/126377.

*Primary Examiner* — Larry W Thrower
(74) *Attorney, Agent, or Firm* — Thomas | Horstemeyer, LLP

(57) ABSTRACT

The present disclosure relates to a method for adjusting grouting parameters in preparation of a ceramic composite fiber-based catalytic filter tube, and a method and a device for preparing a ceramic composite fiber-based catalytic filter tube. In the present disclosure, a loading reference value of a slurry is determined by a fiber length, a pH value, and a solid phase content of the slurry, thus evaluating a performance value of the slurry; initial working parameters for preparation are determined by comparing the loading reference value of the slurry with a preset value. During the actual preparation, a grouting amount is introduced to conduct conversion check on a quality of the slurry, so as to ensure a grouting pressure and a grouting pressure holding time during the grouting.

17 Claims, 2 Drawing Sheets

(51) Int. Cl.

| | |
|---|---|
| ***B01F 35/71*** | (2022.01) |
| ***B01J 23/648*** | (2006.01) |
| ***B01J 35/58*** | (2024.01) |
| ***B01J 37/02*** | (2006.01) |
| ***B01J 37/03*** | (2006.01) |
| ***B01J 37/08*** | (2006.01) |

(52) U.S. Cl.

CPC .... *B01F 35/7176* (2022.01); *B01F 35/71805* (2022.01); *B01J 23/6482* (2013.01); *B01J 35/58* (2024.01); *B01J 37/0219* (2013.01); *B01J 37/038* (2013.01); *B01J 37/08* (2013.01); *B01D 2239/0407* (2013.01); *B01D 2239/0492* (2013.01); *B01D 2239/10* (2013.01); *B01D 2239/1208* (2013.01)

(56) References Cited

FOREIGN PATENT DOCUMENTS

| | | | | |
|---|---|---|---|---|
| CN | 103406975 | A | | 11/2013 |
| CN | 109589712 | A | | 4/2019 |
| CN | 110038368 | | * | 4/2019 |
| CN | 110038368 | A | | 7/2019 |
| CN | 110922201 | A | | 3/2020 |
| CN | 111618978 | A | | 9/2020 |
| CN | 112848001 | A | | 5/2021 |
| CN | 113049450 | A | | 6/2021 |

* cited by examiner

METHOD FOR ADJUSTING GROUTING PARAMETERS IN PREPARATION OF CERAMIC COMPOSITE FIBER-BASED CATALYTIC FILTER TUBE, AND METHOD AND DEVICE FOR PREPARING CERAMIC COMPOSITE FIBER-BASED CATALYTIC FILTER TUBE

CROSS REFERENCE TO RELATED APPLICATIONS

The present application is the U.S. National Phase under 35 U.S.C. § 371 of International Application No. PCT/CN2021/126377, filed Oct. 26, 2021, which claims the priority to Chinese Patent Application No. 202110783435.8, titled "METHOD FOR ADJUSTING GROUTING PARAMETERS IN PREPARATION OF CERAMIC COMPOSITE FIBER-BASED CATALYTIC FILTER TUBE, AND METHOD AND DEVICE FOR PREPARING CERAMIC COMPOSITE FIBER-BASED CATALYTIC FILTER TUBE", filed with China National Intellectual Property Administration (CNIPA) on Jul. 12, 2021, both of which are incorporated herein by reference in their entirety.

TECHNICAL FIELD

The present disclosure relates to the technical field of filter tube preparation, in particular to a method for adjusting grouting parameters in preparation of a ceramic composite fiber-based catalytic filter tube, and a method and a device for preparing a ceramic composite fiber-based catalytic filter tube.

BACKGROUND

High-temperature dusty gas is generally produced in chemical industry, petroleum, metallurgy, electric power and other industries. According to the temperature, the flue gas include high-temperature flue gas (>600° C.), medium-temperature flue gas (230° C. to 600° C.), and low-temperature flue gas (<230° C.) in thermal power engineering. However, there is no uniform standard for the temperature classification of filtered flue gas. At present, it is generally considered that flue gas above 220° C. is called the high-temperature flue gas. Industrial high-temperature flue gas has a high temperature, and includes a large amount of dust containing fine impurity particles and harmful chemical substances, which is the cause of many problems such as environmental pollution, greenhouse effect, and energy crisis. The dust removal and purification treatment of these gases has become a key to alleviating environmental problems. Ceramic fibers have been used in the treatment of exhaust gas due to desirable thermal stability, chemical stability, and thermal shock resistance.

In the prior art, there is still a lack of a method for adjusting preparation parameters of a ceramic composite fiber-based filter tube to be prepared by determining a loading reference value according to actual parameters of a slurry during the preparation, such that it is difficult to improve a preparation efficiency.

SUMMARY

An objective of the present disclosure is to provide a method for adjusting grouting parameters in preparation of a ceramic composite fiber-based catalytic filter tube, and a method and a device for preparing a ceramic composite fiber-based catalytic filter tube. The present disclosure aims to overcome the problems in the prior art that it is difficult to determine a loading reference value according to actual parameters of a slurry, to adjust preparation parameters of a ceramic composite fiber-based filter tube to be prepared, and to improve a preparation efficiency.

To achieve the above objective, the present disclosure provides a method for adjusting grouting parameters in preparation of a ceramic composite fiber-based catalytic filter tube, including the following steps:

- inputting a fiber length, a pH value, and a solid phase content of a slurry in preparation of a ceramic composite fiber-based catalytic filter tube into a central control unit in advance; determining a loading reference value of the slurry by the central control unit according to the fiber length, the pH value, and the solid phase content of the slurry; and determining a grouting pressure and a grouting pressure holding time of a grouting unit that is arranged on a left side of a mold and connected to a pressure grouting port, as well as a suction pressure and a suction time of a vacuum pump that is arranged below the mold;
- when determining the grouting pressure of the grouting unit and conducting operation to the grouting pressure holding time by the central control unit, determining whether it is necessary to adjust the grouting pressure holding time by the central control unit according to a real-time grouting amount and a preset grouting amount transmitted by a grouting meter; if yes, extending the grouting pressure holding time to varying degrees by the central control unit according to a difference range between the real-time grouting amount and the preset grouting amount; and
- when conducting operation according to a determined grouting pressure to the grouting pressure holding time or an adjusted grouting pressure holding time with the grouting unit, controlling a first electromagnetic valve to close with central control unit; when controlling the vacuum pump to conduct operation to half of the suction time by the central control unit according to a determined suction pressure, receiving an ultrasonic thickness gauge that is arranged on a right side of the mold by the central control unit, to detect a thickness of a blank tube of a ceramic composite fiber-based filter tube; and comparing an actual thickness of the blank tube with a gap inside the mold by the central control unit, adjusting the suction pressure of the vacuum pump according to different results of the comparison, and then conducting operation to the suction time according to an adjusted suction pressure of the vacuum pump.

The present disclosure further provides a preparation method of a ceramic composite fiber-based catalytic filter tube, including the following steps:

- step S1, conducting pretreatment on a fiber to obtain a required slurry;
- step S2, injecting the slurry into a mold of a ceramic composite fiber-based filter tube through a pressure grouting port above the mold to obtain a blank tube of the ceramic composite fiber-based filter tube;
- step S3, controlling to close a first electromagnetic valve provided above the pressure grouting port with a central control unit, and controlling a vacuum pump to conduct suction on the blank tube of the ceramic composite fiber-based filter tube by the central control unit to obtain a shaped blank tube of the ceramic composite fiber-based filter tube;

step S4, placing the shaped blank tube of the ceramic composite fiber-based filter tube into a sol of a catalyst, and conducting immersing, air-drying, drying, and sintering under vacuum conditions to obtain a ceramic composite fiber-based filter tube with a catalytic function; where the catalyst includes the following components in percentage by weight: 0.5% to 1.5% of platinum, 2% to 5% of vanadium pentoxide, 1% to 3% of rare earth, 0.2% to 0.5% of titanium dioxide, 0.2% to 0.6% of thiourea, 0.3% to 0.5% of Tween 60, 0.1% to 0.5% of a dispersant, and 90% to 93.4% of pure water; and step S5, drying the ceramic composite fiber-based filter tube with a catalytic function in a drying room to obtain the ceramic composite fiber-based catalytic filter tube; where in step S2, the preparation method further includes: before grouting, inputting a fiber length, a pH value, and a solid phase content of a slurry into a central control unit in advance; determining a loading reference value of the slurry by the central control unit according to the fiber length, the pH value, and the solid phase content of the slurry; and determining a grouting pressure and a grouting pressure holding time of a grouting unit that is arranged on a left side of a mold and connected to a pressure grouting port, as well as a suction pressure and a suction time of a vacuum pump that is arranged below the mold;

when determining the grouting pressure of the grouting unit and conducting operation to the grouting pressure holding time by the central control unit, determining whether it is necessary to adjust the grouting pressure holding time by the central control unit according to a real-time grouting amount and a preset grouting amount transmitted by a grouting meter; if yes, extending the grouting pressure holding time to varying degrees by the central control unit according to a difference range between the real-time grouting amount and the preset grouting amount; and when conducting operation according to a determined grouting pressure to the grouting pressure holding time or an adjusted grouting pressure holding time with the grouting unit, controlling a first electromagnetic valve to close with central control unit; when controlling the vacuum pump to conduct operation to half of the suction time by the central control unit according to a determined suction pressure, receiving an ultrasonic thickness gauge that is arranged on a right side of the mold by the central control unit, to detect a thickness of a blank tube of a ceramic composite fiber-based filter tube; and comparing an actual thickness of the blank tube with a gap inside the mold by the central control unit, adjusting the suction pressure of the vacuum pump according to different results of the comparison, and then conducting operation to the suction time according to an adjusted suction pressure of the vacuum pump;

after completing a first ceramic composite fiber-based filter tube, comparing a porosity of the prepared ceramic composite fiber-based filter tube with that of a ceramic composite fiber-based filter tube to be prepared by the central control unit, and adjusting the grouting pressure according to a comparison result for preparing a same type of the ceramic composite fiber-based filter tube next time; and when preparing the same type of the ceramic composite fiber-based filter tube next time, readjusting the grouting pressure determined according to the loading reference value after the adjustment next time, and conducting operation with an adjusted grouting pressure.

Further, in step S2, the loading reference value z of the slurry is determined by the central control unit according to the fiber length, the pH value, and the solid phase content of the slurry, $$z=L/L0+pH/pH0+G/G0$$

in the above formula, z represents the loading reference value of the slurry, L represents the fiber length of the slurry, L0 represents a preset fiber length of the slurry, pH represents the pH value of the slurry, pH0 represents a preset pH value of the slurry, G represents the solid phase content of the slurry, and G0 represents a preset solid phase content of the slurry.

Further, loading reference values z1, z2, z3, . . . , and zn are preset in the central control unit; z1 represents a first preset loading reference value, z2 represents a second preset loading reference value, z3 represents a third preset loading reference value, . . . , and zn represents an n-th preset loading reference value, satisfying z1<z2<z3< . . . <zn;

grouting pressures P1, P2, P3, . . . , and Pn are preset in the central control unit; P1 represents a first preset grouting pressure, P2 represents a second preset grouting pressure, P3 represents a third preset grouting pressure, . . . , and Pn represents an n-th preset grouting pressure, satisfying P1<P2<P3< . . . <Pn;

grouting pressure holding times T1, T2, T3, . . . , and Tn are preset in the central control unit; T1 represents a first preset grouting pressure retention time, T2 represents a second preset grouting pressure holding time, T3 represents a third preset grouting pressure holding time, . . . and Tn represents an n-th preset grouting pressure holding time, satisfying T1<T2<T3< . . . <Tn;

suction pressures K1, K2, K3, . . . , and Kn of the vacuum pump are preset in the central control unit; K1 represents a first preset suction pressure of the vacuum pump, K2 represents a second preset suction pressure of the vacuum pump, K3 represents a third preset suction pressure of the vacuum pump, . . . , and Kn represents an n-th preset suction pressure of the vacuum pump, satisfying K1<K2<K3< . . . <Kn; and suction times t1, t2, t3, . . . , and tn of the vacuum pump are preset in the central control unit; t1 represents a first preset suction time of the vacuum pump, t2 represents a second preset suction time of the vacuum pump, t3 represents a third preset suction time of the vacuum pump, . . . , and tn represents an n-th preset suction time of the vacuum pump, satisfying t1<t2<t3< . . . <tn.

Further, in step S2, the grouting pressure and the grouting pressure holding time are determined by the central control unit according to a determined loading reference value z of the slurry, if z≤z1 is satisfied, it is determined by the central control unit that the grouting pressure is P1, the grouting pressure holding time is T1, the suction pressure of the vacuum pump is K1, and the suction time of the vacuum pump is t1;

if z1<z≤z2 is satisfied, it is determined by the central control unit that the grouting pressure is P2, the grouting pressure holding time is T2, the suction pressure of the vacuum pump is K2, and the suction time of the vacuum pump is t2;

if z2<z≤z3 is satisfied, it is determined by the central control unit that the grouting pressure is P3, the grouting pressure holding time is T3, the suction pressure of the vacuum pump is K3, and the suction time of the vacuum pump is t3; similarly, if $z(n-1)<z\leq zn$ is satisfied, it is determined by the central control unit that the grouting pressure is Pn, the grouting pressure holding time is Tn, the suction pressure of the vacuum pump is Kn, and the suction time of the vacuum pump is tn.

Further, when a grouting pressure Pi of the grouting unit is determined by the central control unit, and the operation is conducted to a grouting pressure holding time Ti, it is set that i=1, 2, 3, . . . , and n, and n is a positive number; it is determined whether there is a need to adjust the grouting pressure holding time by the central control unit according to the real-time grouting amount and the preset grouting amount transmitted by the grouting meter; the real-time grouting amount is set as Qs, and the preset grouting amount is set as Qy, if $Qs\geq Qy$ is satisfied, the grouting pressure holding time is not adjusted by the central control unit; and if $Qs<Qy$ is satisfied, the grouting pressure holding time is adjusted by the central control unit.

Further, the grouting pressure holding time is adjusted by the central control unit according to a difference between the real-time grouting amount and the preset grouting amount; a first reference value Q1 of a grouting amount is set, a second reference value Q2 of the grouting amount is set, and a current grouting pressure holding time is set as Ti, satisfying i=1, 2, 3, . . . , and n, if $Qy-Qs\leq Q1$ is satisfied, the grouting pressure holding time is adjusted by the central control unit to Tz, satisfying $Tz=Ti+0.2\times T1$;

if $Q1<Qy-Qs\leq Q2$ is satisfied, the grouting pressure holding time is adjusted by the central control unit to Tz, satisfying $Tz=Ti+0.5\times T1$; and if $Qy-Qs>Q2$ is satisfied, the grouting unit is determined by the central control unit to be faulty.

Further, if the difference between the real-time grouting amount and the preset grouting amount is greater than Q2, the grouting unit is determined by the central control unit to be faulty.

Further, when the grouting unit is operated according to the determined grouting pressure Pi to the grouting pressure holding time Ti, or when the grouting unit is controlled by the central control unit to operate according to the determined grouting pressure Pi to an adjusted grouting pressure holding time Tz, the first electromagnetic valve provided above the pressure grouting port is controlled to close by the central control unit, while the vacuum pump is started.

Further, in step S3, after the first electromagnetic valve provided above the pressure grouting port is controlled to close by the central control unit, when the vacuum pump is controlled to operate to ti/2 by the central control unit according to a determined suction pressure Ki, the ultrasonic thickness gauge that is arranged on the right side of the mold is received by the central control unit, to detect the thickness of the blank tube of the ceramic composite fiber-based filter tube; and the actual thickness of the blank tube is compared with the gap inside the mold by the central control unit; the thickness of the blank tube of the ceramic composite fiber-based filter tube is set as Hs, the gap inside the mold is set as H0, and a first reference value H1 of the thickness of the blank tube is set, if $H0-Hs<H1$ is satisfied, the suction pressure of the vacuum pump is determined by the central control unit to be Kz, satisfying $Kz=1.05\times Ki$;

if $H0-Hs=H1$ is satisfied, the suction pressure of the vacuum pump is not adjusted by the central control unit; and if $H0-Hs>H1$ is satisfied, the suction pressure of the vacuum pump is adjusted by the central control unit to be Kz, satisfying $Kz=0.95\times Ki$.

Further, the porosity of the ceramic composite fiber-based filter tube is detected by the central control unit; a porosity A of the ceramic composite fiber-based filter tube is set, a porosity A0 of the ceramic composite fiber-based filter tube to be prepared is set, A is compared with A0, and a porosity reference value A1 is set; an actual porosity of the ceramic composite fiber-based filter tube is compared with a preset porosity by the central control unit, and the grouting pressure is adjusted for preparing the same type of the ceramic composite fiber-based filter tube next time, if $|A-A0|\leq A1$ is satisfied, the grouting pressure is adjusted by the central control unit;

if $A=A0$ is satisfied, the grouting pressure is not adjusted by the central control unit; and if $|A-A0|>A1$ is satisfied, the grouting unit is determined by the central control unit to be faulty.

Further, a detection result of the porosity of the ceramic composite fiber-based filter tube is input to the central control unit, and the porosity of an actually-prepared filter tube is compared with that of a filter tube to be prepared by the central control unit, thereby adjusting the grouting pressure for preparing the same type of the ceramic composite fiber-based filter tube next time.

Further, when adjusting the grouting pressure, the grouting pressure determined for preparing the same type of the ceramic composite fiber-based filter tube next time is set to be Px, satisfying x=1, 2, 3, . . . , and n;

if $A-A0\leq A1$ is satisfied, the grouting pressure for preparing the same type of the ceramic composite fiber-based filter tube next time is determined by the central control unit as Pz, satisfying $Pz=1.05\times Px$; and if $A0-A\leq A1$ is satisfied, the grouting pressure for preparing the same type of the ceramic composite fiber-based filter tube next time is determined by the central control unit as Pz, satisfying $Pz=0.95\times Px$.

Further, when preparing the same type of the ceramic composite fiber-based filter tube next time, a loading reference value of the slurry in the next preparation is determined with the central control unit according to the fiber length, the pH value, and the solid phase content of the slurry, and the grouting pressure and the grouting pressure holding time of the grouting unit 2, as well as the suction pressure and the suction time of the vacuum pump 3 are determined according to the loading reference value; the determined grouting pressure is adjusted by the central control unit, and grouting is conducted with an adjusted grouting pressure.

Further, when adjusting the grouting pressure holding time, if an adjusted grouting pressure holding time Tz is greater than Tn, the Tn is used as an adjusted time; if the adjusted grouting pressure holding time Tz is less than T1, the T1 is used as the adjusted time;

when adjusting the grouting pressure, if an adjusted grouting pressure Pz is greater than Pn, the Pn is used as an adjusted grouting pressure; if the adjusted grouting pressure Pz is less than P1, the P1 is used as the adjusted grouting pressure; and when adjusting the suction pressure of the vacuum pump, if an adjusted suction pressure Kz of the vacuum pump is greater than Kn, the Kn is used as an adjusted suction pressure; if the adjusted suction pressure Kz of the vacuum pump is greater than K1, the K1 is used as the adjusted suction pressure.

The present disclosure further provides a preparation device of a ceramic composite fiber-based catalytic filter tube, including a mold 1, a grouting unit 2 provided on a left side of the mold 1, a vacuum filtrate tank provided below the mold 1, a vacuum pump 3 provided above the vacuum filtrate tank, a central control unit 4, and an ultrasonic thickness gauge 31; where the grouting unit 2 includes a pressure grouting port 21, a first electromagnetic valve 22, a grouting pump 23, and a grouting meter 24; the central control unit 4 is arranged on a left side of the mold 1, and the ultrasonic thickness gauge 31 is arranged on the left side of the mold 1; and the central control unit 4 regulates a preparation process of the filter tube by adjusting a grouting pressure of the grouting pump 23 and a pressure of the vacuum pump 3.

Compared with the prior art, the present disclosure has the following beneficial effects: the present disclosure provides a preparation method of a ceramic composite fiber-based catalytic filter tube. The loading reference value of the slurry is determined by the fiber length, the pH value, and the solid phase content of the slurry. The grouting pressure and grouting pressure holding time of the grouting unit, as well as the suction pressure and suction time of the vacuum pump are determined by the central control unit according to the loading reference value. When operating at the grouting pressure of the grouting unit to the grouting pressure holding time, the grouting pressure holding time is adjusted according to a comparison difference between the real-time grouting amount and the preset grouting amount. After the grouting is completed, when the vacuum pump operates according to a determined suction pressure until half of the suction time, the suction pressure of the vacuum pump is adjusted with the central control unit according to a difference between the actual thickness of the blank tube and the preset thickness, and operation is conducted at an adjusted suction pressure of the vacuum pump to the suction time. After the preparation is completed, the grouting pressure for the next preparation of the same type of the filter tube is adjusted with the central control unit according to a comparison between the porosity of the prepared ceramic composite fiber-based filter tube and the preset porosity. Through layer-by-layer adjustment, the grouting pressure holding time and suction pressure are adjusted to improve the precise control during the preparation; Meanwhile, the grouting pressure for the next preparation is adjusted according to the porosity of the prepared filter tube. Therefore, the precision during the preparation is improved by self-learning, thereby improving a preparation efficiency of the ceramic composite fiber-based filter tube.

Especially, in the present disclosure, a loading reference value z of a slurry is determined by a fiber length, a pH value, and a solid phase content of the slurry, thus evaluating a performance value of the slurry; initial working parameters for preparation are determined by comparing the loading reference value of the slurry with a preset value. During the actual preparation, a grouting amount is introduced to conduct conversion check on a quality of the slurry, so as to ensure a grouting pressure and a grouting pressure holding time during the grouting. By adjusting the grouting parameters during the preparation, a grouting efficiency is ensured while improving a positive promotion effect of the grouting on the filter tube, which can further enhance a preparation efficiency of the ceramic composite fiber-based filter tube.

Further, in the present disclosure, through the adjustment of a grouting pressure holding time, the grouting pressure holding time is immediately extended to ensure the grouting effect. When adjusting the working parameters of the vacuum pump, by comparing the thickness of the blank tube with the preset thickness under a preset pressure, the subsequent suction pressure of the vacuum pump is adjusted to improve a shaping effect of the blank tube, thereby improving the preparation efficiency of the ceramic composite fiber-based filter tube.

In particular, in the present disclosure, after the preparation of the filter tube is completed, the grouting pressure for the next preparation of the same type of the ceramic composite fiber-based filter tube is adjusted according to the porosity of the filter tube and the porosity of a filter tube to be prepared. Through a self-learning process of the central control unit, the difference between the prepared filter tube and the filter tube to be prepared is improved layer by layer, thus gradually improving the preparation efficiency of the ceramic composite fiber-based filter tube.

DETAILED DESCRIPTION OF THE EMBODIMENTS

The method for preparing a ceramic composite fiber-based catalytic filter tube provided by the present disclosure is described in detail below in connection with Examples, but these Examples should not be understood as limiting the claimed scope of the present disclosure.

To make the objects and advantages of the present disclosure clearer, the present disclosure will be further described below in conjunction with the examples; it should be understood that the specific examples described here are only used to explain, but not to limit the present disclosure.

The preferred implementations of the present disclosure are described below with reference to the drawings. Those skilled in the art should understand that the implementations herein are merely intended to explain the technical principles of the present disclosure, rather than to limit the protection scope of the present disclosure.

It should be noted that in the description of the present disclosure, terms such as "upper", "lower", "left", "right", "inner" and "outer" indicate orientation or position relationships based on the accompanying drawings. They are merely intended to facilitate description, rather than to indicate or imply that the mentioned device or assemblies must have a specific orientation and must be constructed and operated in a specific orientation. Therefore, these terms should not be construed as a limitation to the present disclosure.

In addition, it should be noted that in the description of the present disclosure, unless otherwise clearly specified, meanings of terms "install", "connect with" and "connect to" should be understood in a broad sense. For example, the connection may be a fixed connection, a removable connection, or an integral connection, may be a mechanical connection or an electrical connection, may be a direct connection or an indirect connection via a medium, and may be an internal connection between two components. Those skilled in the art should understand the specific meanings of the above terms in the present disclosure based on specific situations.

Figure 1:
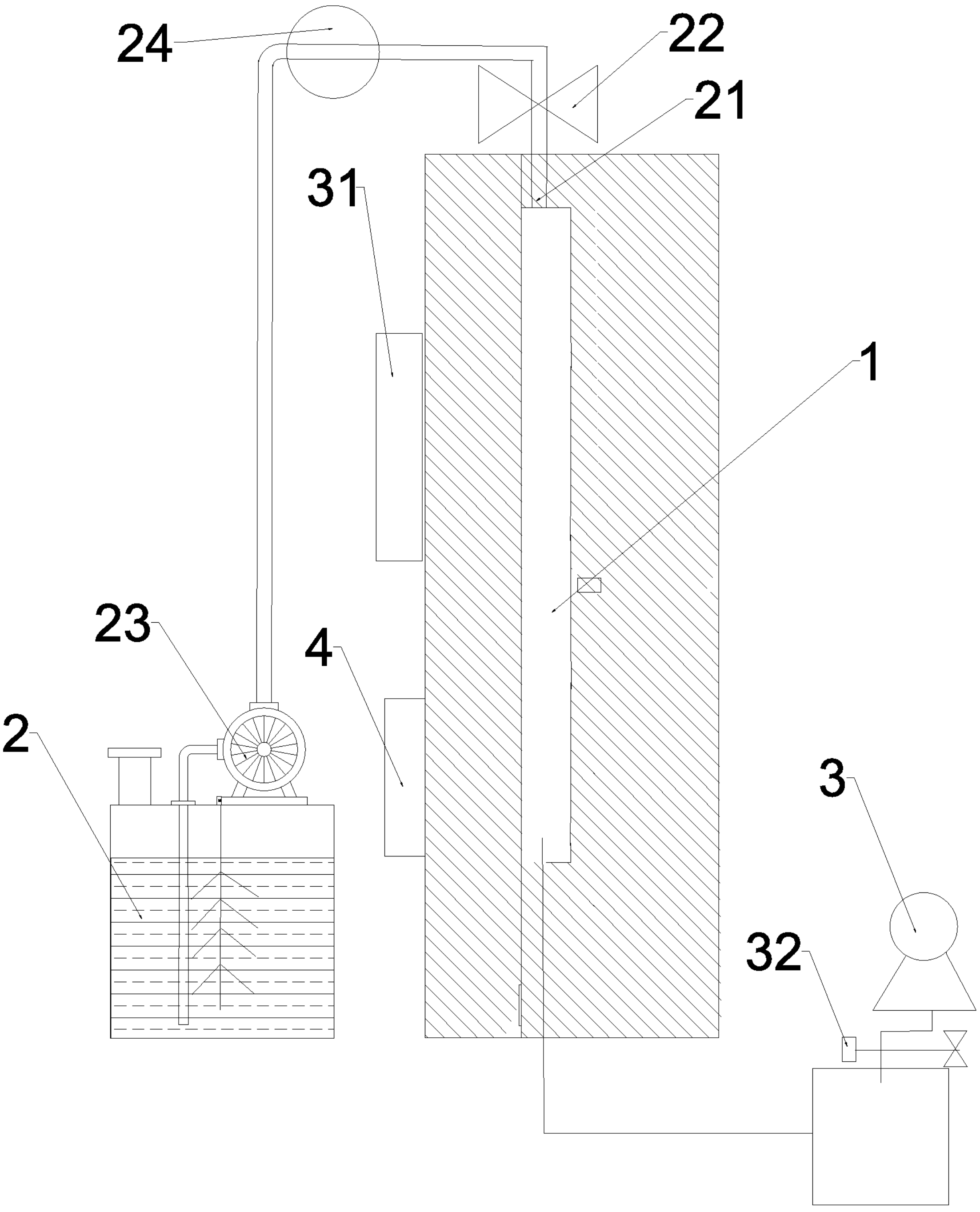
FIG. 1 shows a structural schematic diagram of a corresponding device of a preparation method of a ceramic composite fiber-based catalytic filter tube in the present disclosure.

As shown in FIG. 1, the present disclosure provides a device corresponding to a preparation method of a ceramic composite fiber-based catalytic filter tube, including a mold 1 and a grouting unit 2 arranged at a left side of the mold 1; where the grouting unit 2 includes a pressure grouting port 21, a first electromagnetic valve 22, a grouting pump 23, and a grouting meter 24; the device further includes a vacuum filtrate tank arranged below the mold 1, a vacuum pump 3 arranged above the vacuum filtrate tank, a vacuum pressure gauge 32, and an emptying valve 33; the central control unit 4 is arranged on a left side of the mold 1, and an ultrasonic thickness gauge 31 is arranged on the left side of the mold 1; and the central control unit regulates a preparation process of the filter tube by adjusting a grouting pressure of the grouting pump 23 and a pressure of the vacuum pump 3.

Figure 2:
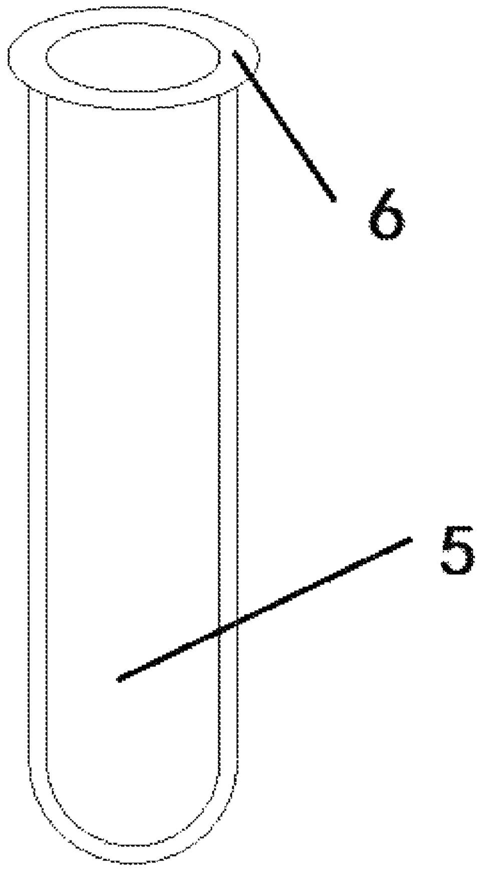
FIG. 2 shows a structural schematic diagram of a filter tube prepared by the preparation method of a ceramic composite fiber-based catalytic filter tube in the present disclosure.

As shown in FIG. 2, it is a structural schematic diagram of a filter tube prepared by the preparation method of a ceramic composite fiber-based catalytic filter tube in the present disclosure. The filter tube includes a tube body 5 and an end body 6, where the end body 6 has a diameter larger than that of the tube body 5.

Specifically, in an example, the present disclosure provides a preparation method of a ceramic composite fiber-based catalytic filter tube, including the following steps:

- step S1, conducting pretreatment on a fiber to obtain a required slurry;
- step S2, injecting the slurry into a mold 1 of a ceramic composite fiber-based filter tube through a pressure grouting port 21 above the mold 1 to obtain a blank tube of the ceramic composite fiber-based filter tube;
- step S3, controlling to close a first electromagnetic valve 22 provided above the pressure grouting port 21 with a central control unit, and controlling a vacuum pump 3 to conduct suction on the blank tube of the ceramic composite fiber-based filter tube by the central control unit to obtain a shaped blank tube of the ceramic composite fiber-based filter tube;
- step S4, placing the shaped blank tube of the ceramic composite fiber-based filter tube into a sol of a catalyst, and conducting immersing, air-drying, drying, and sintering under vacuum conditions to obtain a ceramic composite fiber-based filter tube with a catalytic function; where the catalyst includes the following components in percentage by weight: 0.5% to 1.5% of platinum, 2% to 5% of vanadium pentoxide, 1% to 3% of rare earth, 0.2% to 0.5% of titanium dioxide, 0.2% to 0.6% of thiourea, 0.3% to 0.5% of Tween 60, 0.1% to 0.5% of a dispersant, and 90% to 93.4% of pure water; and
- step S5, drying the ceramic composite fiber-based filter tube with a catalytic function in a drying room to obtain the ceramic composite fiber-based catalytic filter tube.

Specifically, in the example, in step S2, the preparation method further includes: before grouting, inputting a fiber length, a pH value, and a solid phase content of a slurry into a central control unit in advance; determining a loading reference value of the slurry by the central control unit according to the fiber length, the pH value, and the solid phase content of the slurry; and determining a grouting pressure and a grouting pressure holding time of a grouting unit 2 that is arranged on a left side of a mold 1 and connected to a pressure grouting port 21, as well as a suction pressure and a suction time of a vacuum pump 3 that is arranged below the mold 1.

Specifically, in the example, when determining the grouting pressure of the grouting unit 2 and conducting operation to the grouting pressure holding time by the central control unit, determining whether it is necessary to adjust the grouting pressure holding time by the central control unit according to a real-time grouting amount and a preset grouting amount transmitted by a grouting meter 24; if yes, extending the grouting pressure holding time to varying degrees by the central control unit according to a difference range between the real-time grouting amount and the preset grouting amount.

Specifically, in the example, when conducting operation according to a determined grouting pressure to the grouting pressure holding time or an adjusted grouting pressure holding time with the grouting unit 2, controlling a first electromagnetic valve 22 to close with central control unit; when controlling the vacuum pump 3 to conduct operation to half of the suction time by the central control unit according to a determined suction pressure, receiving an ultrasonic thickness gauge 31 that is arranged on a right side of the mold 1 by the central control unit, to detect a thickness of a blank tube of a ceramic composite fiber-based filter tube; and comparing an actual thickness of the blank tube with a gap inside the mold 1 by the central control unit, adjusting the suction pressure of the vacuum pump 3 according to different results of the comparison, and then conducting operation to the suction time according to an adjusted suction pressure of the vacuum pump 3.

Specifically, in the example, after completing a first ceramic composite fiber-based filter tube, comparing a porosity of the prepared ceramic composite fiber-based filter tube with that of a ceramic composite fiber-based filter tube to be prepared by the central control unit, and adjusting the grouting pressure according to a comparison result for preparing a same type of the ceramic composite fiber-based filter tube next time.

Specifically, in the example, when preparing the same type of the ceramic composite fiber-based filter tube next time, readjusting the grouting pressure determined according to the loading reference value after the adjustment next time, and conducting operation with an adjusted grouting pressure.

Specifically, in the example, in step S2, the loading reference value z of the slurry is determined by the central control unit according to the fiber length, the pH value, and the solid phase content of the slurry, $$z=L/L0+\mathrm{pH}/\mathrm{pH}0+G/G0$$

in the above formula, z represents the loading reference value of the slurry, L represents the fiber length of the slurry, L0 represents a preset fiber length of the slurry, pH represents the pH value of the slurry, pH0 represents a preset pH value of the slurry, G represents the solid phase content of the slurry, and G0 represents a preset solid phase content of the slurry.

Specifically, in the example, the solid phase content of the slurry can be a percentage obtained by dividing a mass before drying by that after drying, or can be measured by a solid content detector; there is no limitation on a method for measuring the solid phase content of the slurry, which depends on the specific implementation. The fiber length of the slurry can be measured directly by a microscope, indirectly by a sieve, or by computer vision-based measurement; there is no limitation on a method for measuring the fiber length of the slurry, which depends on the specific implementation. The pH value of the slurry can be measured directly with a pH meter; similarly, there is no limitation on a method for measuring the pH value of the slurry, which depends on the specific implementation. In the example, the fiber length, the pH value, and the solid phase content of the slurry are collected in advance before grouting, and then input into the central control unit in advance; the loading reference value is calculated with the central control unit according to the fiber length, the pH value, and the solid phase content of the slurry.

Specifically, in the example, a preset fiber length of the slurry can be set according to the specific implementation; the preset fiber length of the slurry refers to a fiber length obtained by shearing, crushing, and sieving a pre-prepared fiber during fiber pretreatment; the pre-prepared fiber can be selected from the group consisting of an aluminum silicate fiber and a zirconia fiber, or can be a zirconium-containing aluminum silicate ceramic fiber, based on the specific implementation; the preset fiber length L0 of the slurry is set to 200 μm. The slurry has a preset pH value pH0 set to 2.5, and a preset solid phase content G0 set to 50%.

Specifically, in the example, loading reference values z1, z2, z3, . . . , and zn are preset in the central control unit; z1 represents a first preset loading reference value, z2 represents a second preset loading reference value, z3 represents a third preset loading reference value, . . . and zn represents an n-th preset loading reference value, satisfying $z1<z2<z3<\dots<zn$.

Specifically, in the example, grouting pressures P1, P2, P3, . . . , and Pn are preset in the central control unit; P1 represents a first preset grouting pressure, P2 represents a second preset grouting pressure, P3 represents a third preset grouting pressure, . . . , and Pn represents an n-th preset grouting pressure, satisfying $P1<P2<P3<\dots<Pn$. Specifically, in the example, grouting pressure holding times T1, T2, T3, . . . , and Tn are preset in the central control unit; T1 represents a first preset grouting pressure retention time, T2 represents a second preset grouting pressure holding time, T3 represents a third preset grouting pressure holding time, . . . , and Tn represents an n-th preset grouting pressure holding time, satisfying $T1<T2<T3<\dots<Tn$.

Specifically, in the example, suction pressures K1, K2, K3, . . . , and Kn of the vacuum pump are preset in the central control unit; K1 represents a first preset suction pressure of the vacuum pump, K2 represents a second preset suction pressure of the vacuum pump, K3 represents a third preset suction pressure of the vacuum pump, . . . , and Kn represents an n-th preset suction pressure of the vacuum pump, satisfying $K1<K2<K3<\dots<Kn$. suction times t1, t2, t3, . . . , and tn of the vacuum pump are preset in the central control unit; t1 represents a first preset suction time of the vacuum pump, t2 represents a second preset suction time of the vacuum pump, t3 represents a third preset suction time of the vacuum pump, . . . , and tn represents an n-th preset suction time of the vacuum pump, satisfying $t1<t2<t3<\dots<tn$.

Specifically, in the example, in step S2, the grouting pressure and the grouting pressure holding time are determined by the central control unit according to a determined loading reference value z of the slurry,

- if $z\le z1$ is satisfied, it is determined by the central control unit that the grouting pressure is P1, the grouting pressure holding time is T1, the suction pressure of the vacuum pump is K1, and the suction time of the vacuum pump is t1;
- if $z1<z\le z2$ is satisfied, it is determined by the central control unit that the grouting pressure is P2, the grouting pressure holding time is T2, the suction pressure of the vacuum pump is K2, and the suction time of the vacuum pump is t2;
- if $z2<z\le z3$ is satisfied, it is determined by the central control unit that the grouting pressure is P3, the grouting pressure holding time is T3, the suction pressure of the vacuum pump is K3, and the suction time of the vacuum pump is t3; similarly,
- if $z(n-1)<z\le zn$ is satisfied, it is determined by the central control unit that the grouting pressure is Pn, the grouting pressure holding time is Tn, the suction pressure of the vacuum pump is Kn, and the suction time of the vacuum pump is tn.

Specifically, in the example, when a grouting pressure Pi of the grouting unit 2 is determined by the central control unit, and the operation is conducted to a grouting pressure holding time Ti, it is set that i=1, 2, 3, . . . , and n, and n is a positive number; it is determined whether there is a need to adjust the grouting pressure holding time by the central control unit according to the real-time grouting amount and the preset grouting amount transmitted by the grouting meter 24; the real-time grouting amount is set as Qs, and the preset grouting amount is set as Qy,

- if $Qs\ge Qy$ is satisfied, the grouting pressure holding time is not adjusted by the central control unit; and
- if $Qs<Qy$ is satisfied, the grouting pressure holding time is adjusted by the central control unit.

Specifically, in the example, the grouting meter 24 may be arranged on a transmission pipeline between the grouting unit 2 and the pressure grouting port 21. By comparing the real-time grouting amount with the preset grouting amount, on the one hand, it is convenient to determine the difference between the grouting amounts; and on the other hand, it can reflect an influence of the grouting pressure on a grouting rate, which is used as a reference for the grouting. The preset grouting amount can be obtained according to an average grouting rate calculated in conjunction with the grouting pressure holding time under a determined grouting pressure, and can also be calculated according to the porosity of the mold 1 and the grouting pressure during the grouting of the slurry under the grouting pressure. The preset grouting amount can further be a preset flow rate calculated according to a real-time thickness of the blank tube of the ceramic composite fiber-based filter tube detected by a laser thickness gauge and a density of the slurry. During specific implementation, a slurry density meter may also be installed in a slurry tank to measure the density of the slurry. In addition, when the real-time grouting amount is greater than the preset grouting amount, since a space in the mold is fixed, a range of the greater real-time grouting amount is highly limited. Therefore, in this case, the grouting pressure holding time is not adjusted, but only a grouting pressure holding time is adjusted when the real-time grouting amount is less than the preset grouting amount, so as to improve the adjustment efficiency.

Specifically, in the example, the grouting pressure holding time is adjusted by the central control unit according to a difference between the real-time grouting amount and the preset grouting amount; a first reference value Q1 of a grouting amount is set, a second reference value Q2 of the grouting amount is set, and a current grouting pressure holding time is set as Ti, satisfying i=1, 2, 3, . . . , and n,

- if $Qy-Qs\le Q1$ is satisfied, the grouting pressure holding time is adjusted by the central control unit to Tz, satisfying $Tz=Ti+0.2\times T1$;

if $Q1<Qy-Qs\leq Q2$ is satisfied, the grouting pressure holding time is adjusted by the central control unit to Tz, satisfying $Tz=Ti+0.5\times T1$; and if $Qy-Qs>Q2$ is satisfied, the grouting unit 2 is determined by the central control unit to be faulty.

Specifically, in the example, if the difference between the real-time grouting amount and the preset grouting amount is greater than Q2, it indicates that there may be a problem with the slurry, or there may be a problem with the grouting pump of the grouting unit, such that the grouting unit is determined by the central control unit to be faulty.

Specifically, in the example, when the grouting unit is operated according to the determined grouting pressure Pi to the grouting pressure holding time Ti, or when the grouting unit 2 is controlled by the central control unit to operate according to the determined grouting pressure Pi to an adjusted grouting pressure holding time Tz, the first electromagnetic valve 22 provided above the pressure grouting port 21 is controlled to close by the central control unit, while the vacuum pump 3 is started.

Specifically, in the example, in step S3, after the first electromagnetic valve 22 provided above the pressure grouting port 21 is controlled to close by the central control unit, when the vacuum pump is controlled to operate to ti/2 by the central control unit according to a determined suction pressure Ki, the ultrasonic thickness gauge 31 that is arranged on the right side of the mold 1 is received by the central control unit, to detect the thickness of the blank tube of the ceramic composite fiber-based filter tube; and the actual thickness of the blank tube is compared with the gap inside the mold 1 by the central control unit; the thickness of the blank tube of the ceramic composite fiber-based filter tube is set as Hs, the gap inside the mold 1 is set as H0, and a first reference value H1 of the thickness of the blank tube is set, if $H0-Hs<H1$ is satisfied, the suction pressure of the vacuum pump is determined by the central control unit to be Kz, satisfying $Kz=1.05\times Ki$;

if $H0-Hs=H1$ is satisfied, the suction pressure of the vacuum pump is not adjusted by the central control unit; and if $H0-Hs>H1$ is satisfied, the suction pressure of the vacuum pump is adjusted by the central control unit to be Kz, satisfying $Kz=0.95\times Ki$.

Specifically, in the example, the thickness of the blank tube of the ceramic composite fiber-based filter tube can be detected by the ultrasonic thickness gauge 31, or can be detected in other ways; there is no limitation on a specific thickness detection method, which depends on the specific implementation. According to a certain position of the mold 1 of the ceramic composite fiber-based filter tube, a plurality of the ultrasonic thickness gauges 31 can be arranged to detect the multiple thicknesses of the blank tube of the ceramic composite fiber-based filter tube, and an average is taken as the thickness of the blank tube of the ceramic composite fiber-based filter tube. If it is a thickness value at a certain place, the thickness is compared with the gap inside the mold 1 at that place; if it is the average, the thickness is compared with the average of the gaps inside the molds 1 at a plurality of places.

Specifically, in the example, the gap inside the mold 1 refers to an interspace inside the mold 1, specifically a space reserved in a middle of the mold 1 for grouting; when referring to a certain position, it refers to a thickness of the grouting layer that the position can accommodate, that is, the gap inside the mold 1.

Specifically, in the example, the porosity of the ceramic composite fiber-based filter tube is detected by the central control unit; a porosity A of the ceramic composite fiber-based filter tube is set, a porosity A0 of the ceramic composite fiber-based filter tube to be prepared is set, A is compared with A0, and a porosity reference value A1 is set; an actual porosity of the ceramic composite fiber-based filter tube is compared with a preset porosity by the central control unit, and the grouting pressure is adjusted for preparing the same type of the ceramic composite fiber-based filter tube next time, if $|A-A0|\leq A1$ is satisfied, the grouting pressure is adjusted by the central control unit;

if $A=A0$ is satisfied, the grouting pressure is not adjusted by the central control unit; and if $|A-A0|>A1$ is satisfied, the grouting unit is determined by the central control unit to be faulty.

Specifically, in the example, when the difference between the porosity of the filter tube and the porosity of the filter tube to be prepared is greater than A1, it indicates that there is a problem with the parameters during the preparation; firstly, it is determined that the grouting unit is faulty, and secondly, during manual inspection, different structural components can be inspected simultaneously. When the difference between the porosity of the filter tube and the porosity of the filter tube to be prepared is within the A1, it means that there is little difference; the next preparation process can be adjusted closer to a required porosity by adjusting the grouting parameters to improve the preparation efficiency.

Specifically, in the example, the porosity of the ceramic composite fiber-based filter tube can be detected by a ceramic porosity detector, and can also be detected by other methods; the detection result is input to the central control unit, and the porosity of an actually-prepared filter tube is compared with that of a filter tube to be prepared by the central control unit, thereby adjusting the grouting pressure for preparing the same type of the ceramic composite fiber-based filter tube next time.

Specifically, in the example, when adjusting the grouting pressure, the grouting pressure determined for preparing the same type of the ceramic composite fiber-based filter tube next time is set to be Px, satisfying x=1, 2, 3, . . . , and n;

if $A-A0\leq A1$ is satisfied, the grouting pressure for preparing the same type of the ceramic composite fiber-based filter tube next time is determined by the central control unit as Pz, satisfying $Pz=1.05\times Px$; and if $A0-A\leq A1$ is satisfied, the grouting pressure for preparing the same type of the ceramic composite fiber-based filter tube next time is determined by the central control unit as Pz, satisfying $Pz=0.95\times Px$.

Specifically, in the example, when preparing the same type of the ceramic composite fiber-based filter tube next time, a loading reference value of the slurry in the next preparation is determined with the central control unit according to the fiber length, the pH value, and the solid phase content of the slurry, and the grouting pressure and the grouting pressure holding time of the grouting unit 2, as well as the suction pressure and the suction time of the vacuum pump 3 are determined according to the loading reference value; the determined grouting pressure is adjusted by the central control unit, and grouting is conducted with an adjusted grouting pressure. Therefore, an influence of the grouting on the porosity of the filter tube during the preparation is improved, thereby improving the efficiency in preparing the filter tube.

Specifically, in the example, when adjusting the grouting pressure holding time, if an adjusted grouting pressure holding time Tz is greater than Tn, the Tn is used as an adjusted time; if the adjusted grouting pressure holding time Tz is less than T1, the T1 is used as the adjusted time. When adjusting the grouting pressure, if an adjusted grouting pressure Pz is greater than Pn, the Pn is used as an adjusted grouting pressure; if the adjusted grouting pressure Pz is less than P1, the P1 is used as the adjusted grouting pressure. When adjusting the suction pressure of the vacuum pump 3, if an adjusted suction pressure Kz of the vacuum pump 3 is greater than Kn, the Kn is used as an adjusted suction pressure; if the adjusted suction pressure Kz of the vacuum pump 3 is greater than K1, the K1 is used as the adjusted suction pressure.

The above descriptions are merely preferred implementations of the present disclosure. It should be noted that a person of ordinary skill in the art may further make several improvements and modifications without departing from the principle of the present disclosure, but such improvements and modifications should be deemed as falling within the protection scope of the present disclosure.

What is claimed is:

1. A preparation method of a ceramic composite fiber-based catalytic filter tube, comprising the following steps:

step S1, conducting pretreatment on a fiber to obtain a required slurry;

step S2, injecting the slurry into a mold of a ceramic composite fiber-based filter tube through a pressure grouting port above the mold to obtain a blank tube of the ceramic composite fiber-based filter tube;

step S3, controlling to close a first electromagnetic valve provided above the pressure grouting port with a central control unit, and controlling a vacuum pump to conduct suction on the blank tube of the ceramic composite fiber-based filter tube by the central control unit to obtain a shaped blank tube of the ceramic composite fiber-based filter tube;

step S4, placing the shaped blank tube of the ceramic composite fiber-based filter tube into a sol of a catalyst, and conducting immersing, air-drying, drying, and sintering under vacuum conditions to obtain a ceramic composite fiber-based filter tube with a catalytic function; wherein the catalyst comprises the following components in percentage by weight: 0.5% to 1.5% of platinum, 2% to 5% of vanadium pentoxide, 1% to 3% of rare earth, 0.2% to 0.5% of titanium dioxide, 0.2% to 0.6% of thiourea, 0.1% to 0.5% of a dispersant, and 90% to 93.4% of pure water; and step S5, drying the ceramic composite fiber-based filter tube with a catalytic function in a drying room to obtain the ceramic composite fiber-based catalytic filter tube; wherein in step S2, the preparation method further comprises: before grouting, inputting a fiber length, a pH value, and a solid phase content of a slurry into a central control unit in advance; determining a loading reference value of the slurry by the central control unit according to the fiber length, the pH value, and the solid phase content of the slurry; and determining a grouting pressure and a grouting pressure holding time of a grouting unit that is arranged on a left side of the mold and connected to a pressure grouting port, as well as a suction pressure and a suction time of the vacuum pump that is arranged below the mold;

when determining the grouting pressure of the grouting unit and conducting operation to the grouting pressure holding time by the central control unit, determining whether it is necessary to adjust the grouting pressure holding time by the central control unit according to a real-time grouting amount and a preset grouting amount transmitted by a grouting meter; if yes, extending the grouting pressure holding time to varying degrees by the central control unit according to a difference range between the real-time grouting amount and the preset grouting amount; and when conducting operation according to a determined grouting pressure to the grouting pressure holding time or an adjusted grouting pressure holding time with the grouting unit, controlling the first electromagnetic valve to close with the central control unit; when controlling the vacuum pump to conduct operation to half of the suction time by the central control unit according to a determined suction pressure, receiving an ultrasonic thickness gauge that is arranged on a right side of the mold by the central control unit, to detect a thickness of a blank tube of a ceramic composite fiber-based filter tube; and comparing an actual thickness of the blank tube with a gap inside the mold by the central control unit, adjusting the suction pressure of the vacuum pump according to different results of the comparison, and then conducting operation to the suction time according to an adjusted suction pressure of the vacuum pump;

after completing a first ceramic composite fiber-based filter tube, comparing a porosity of the prepared ceramic composite fiber-based filter tube with that of a ceramic composite fiber-based filter tube to be prepared by the central control unit, and adjusting the grouting pressure according to a comparison result for preparing a same type of the ceramic composite fiber-based filter tube next time; and when preparing the same type of the ceramic composite fiber-based filter tube next time, readjusting the grouting pressure determined according to the loading reference value after the adjustment next time, and conducting operation with an adjusted grouting pressure.

2. The preparation method of a ceramic composite fiber-based catalytic filter tube according to claim 1, wherein in step S2, the loading reference value z of the slurry is determined by the central control unit according to the fiber length, the pH value, and the solid phase content of the slurry, $$z=L/L0+\mathrm{pH}/\mathrm{pH}0+G/G0$$

in the above formula, z represents the loading reference value of the slurry, L represents the fiber length of the slurry, L0 represents a preset fiber length of the slurry, pH represents the pH value of the slurry, pH0 represents a preset pH value of the slurry, G represents the solid phase content of the slurry, and G0 represents a preset solid phase content of the slurry.

3. The preparation method of a ceramic composite fiber-based catalytic filter tube according to claim 2, wherein loading reference values z1, z2, z3, . . . , and zn are preset in the central control unit; z1 represents a first preset loading reference value, z2 represents a second preset loading reference value, z3 represents a third preset loading reference value, . . . , and zn represents an n-th preset loading reference value, satisfying $z1<z2<z3< \ldots <zn$;

grouting pressures P1, P2, P3, . . . , and Pn are preset in the central control unit; P1 represents a first preset grouting pressure, P2 represents a second preset grouting pressure, P3 represents a third preset grouting pressure, . . . , and Pn represents an n-th preset grouting pressure, satisfying $P1<P2<P3< \ldots <Pn$;

grouting pressure holding times T1, T2, T3, . . . , and Tn are preset in the central control unit; T1 represents a first preset grouting pressure retention time, T2 represents a second preset grouting pressure holding time, T3 represents a third preset grouting pressure holding time, . . . , and Tn represents an n-th preset grouting pressure holding time, satisfying T1<T2<T3< . . . <Tn;

suction pressures K1, K2, K3, . . . , and Kn of the vacuum pump are preset in the central control unit; K1 represents a first preset suction pressure of the vacuum pump, K2 represents a second preset suction pressure of the vacuum pump, K3 represents a third preset suction pressure of the vacuum pump, . . . , and Kn represents an n-th preset suction pressure of the vacuum pump, satisfying K1<K2<K3< . . . <Kn; and suction times t1, t2, t3, . . . , and tn of the vacuum pump are preset in the central control unit; t1 represents a first preset suction time of the vacuum pump, t2 represents a second preset suction time of the vacuum pump, t3 represents a third preset suction time of the vacuum pump, . . . , and tn represents an n-th preset suction time of the vacuum pump, satisfying t1<t2<t3< . . . <tn.

4. The preparation method of a ceramic composite fiber-based catalytic filter tube according to claim 3, wherein in step S2, the grouting pressure and the grouting pressure holding time are determined by the central control unit according to a determined loading reference value z of the slurry, if z≤z1 is satisfied, it is determined by the central control unit that the grouting pressure is P1, the grouting pressure holding time is T1, the suction pressure of the vacuum pump is K1, and the suction time of the vacuum pump is t1;

if z1<z≤z2 is satisfied, it is determined by the central control unit that the grouting pressure is P2, the grouting pressure holding time is T2, the suction pressure of the vacuum pump is K2, and the suction time of the vacuum pump is t2;

if z2<z≤z3 is satisfied, it is determined by the central control unit that the grouting pressure is P3, the grouting pressure holding time is T3, the suction pressure of the vacuum pump is K3,and the suction time of the vacuum pump is t3; similarly, if z(n−1)<z≤zn is satisfied, it is determined by the central control unit that the grouting pressure is Pn, the grouting pressure holding time is Tn, the suction pressure of the vacuum pump is Kn, and the suction time of the vacuum pump is tn.

5. The preparation method of a ceramic composite fiber-based catalytic filter tube according to claim 4, wherein when a grouting pressure Pi of the grouting unit is determined by the central control unit, and the operation is conducted to a grouting pressure holding time Ti, it is set that i=1, 2, 3, . . . , and n, and n is a positive number; it is determined whether there is a need to adjust the grouting pressure holding time by the central control unit according to the real-time grouting amount and the preset grouting amount transmitted by the grouting meter; the real-time grouting amount is set as Qs, and the preset grouting amount is set as Qy, if Qs≥Qy is satisfied, the grouting pressure holding time is not adjusted by the central control unit; and if Qs<Qy is satisfied, the grouting pressure holding time is adjusted by the central control unit.

6. The preparation method of a ceramic composite fiber-based catalytic filter tube according to claim 5, wherein the grouting pressure holding time is adjusted by the central control unit according to a difference between the real-time grouting amount and the preset grouting amount; a first reference value Q1 of a grouting amount is set, a second reference value Q2 of the grouting amount is set, and a current grouting pressure holding time is set as Ti, satisfying i=1, 2, 3, . . . , and n, if Qy−Qs≤Q1 is satisfied, the grouting pressure holding time is adjusted by the central control unit to Tz, satisfying Tz=Ti+0.2×T1;

if Q1<Qy−Qs≤Q2 is satisfied, the grouting pressure holding time is adjusted by the central control unit to Tz, satisfying Tz=Ti+0.5×T1; and if Qy−Qs>Q2 is satisfied, the grouting unit is determined by the central control unit to be faulty.

7. The preparation method of a ceramic composite fiber-based catalytic filter tube according to claim 6, wherein if the difference between the real-time grouting amount and the preset grouting amount is greater than Q2, the grouting unit is determined by the central control unit to be faulty.

8. The preparation method of a ceramic composite fiber-based catalytic filter tube according to claim 6, wherein when the grouting unit is operated according to the determined grouting pressure Pi to the grouting pressure holding time Ti, or when the grouting unit is controlled by the central control unit to operate according to the determined grouting pressure Pi to an adjusted grouting pressure holding time Tz, the first electromagnetic valve provided above the pressure grouting port is controlled to close by the central control unit, while the vacuum pump is started.

9. The preparation method of a ceramic composite fiber-based catalytic filter tube according to claim 6, wherein in step S3, after the first electromagnetic valve provided above the pressure grouting port is controlled to close by the central control unit, when the vacuum pump is controlled to operate to ti/2 by the central control unit according to a determined suction pressure Ki, the ultrasonic thickness gauge that is arranged on the right side of the mold is received by the central control unit, to detect the thickness of the blank tube of the ceramic composite fiber-based filter tube; and the actual thickness of the blank tube is compared with the gap inside the mold by the central control unit; the thickness of the blank tube of the ceramic composite fiber-based filter tube is set as Hs, the gap inside the mold is set as H0, and a first reference value H1 of the thickness of the blank tube is set, if H0−Hs<H1 is satisfied, the suction pressure of the vacuum pump is determined by the central control unit to be Kz, satisfying Kz=1.05×Ki;

if H0−Hs=H1 is satisfied, the suction pressure of the vacuum pump is not adjusted by the central control unit; and if H0−Hs>H1 is satisfied, the suction pressure of the vacuum pump is adjusted by the central control unit to be Kz, satisfying Kz=0.95×Ki.

10. The preparation method of a ceramic composite fiber-based catalytic filter tube according to claim 9, wherein a detection result of the porosity of the ceramic composite fiber-based filter tube is input to the central control unit, and the porosity of an actually-prepared filter tube is compared with that of a filter tube to be prepared by the central control unit, thereby adjusting the grouting pressure for preparing the same type of the ceramic composite fiber-based filter tube next time.

11. The preparation method of a ceramic composite fiber-based catalytic filter tube according to claim 9, wherein when adjusting the grouting pressure, the grouting pressure determined for preparing the same type of the ceramic composite fiber-based filter tube next time is set to be Px, satisfying x=1, 2, 3, . . . , and n;

if A−A0≤A1 is satisfied, the grouting pressure for preparing the same type of the ceramic composite fiber-based filter tube next time is determined by the central control unit as Pz, satisfying Pz=1.05×Px; and if A0−A≤A1 is satisfied, the grouting pressure for preparing the same type of the ceramic composite fiber-based filter tube next time is determined by the central control unit as Pz, satisfying Pz=0.95×Px.

12. The preparation method of a ceramic composite fiber-based catalytic filter tube according to claim 11, wherein when preparing the same type of the ceramic composite fiber-based filter tube next time, a loading reference value of the slurry in the next preparation is determined with the central control unit according to the fiber length, the pH value, and the solid phase content of the slurry, and the grouting pressure and the grouting pressure holding time of the grouting unit, as well as the suction pressure and the suction time of the vacuum pump are determined according to the loading reference value; the determined grouting pressure is adjusted by the central control unit, and grouting is conducted with an adjusted grouting pressure.

13. The preparation method of a ceramic composite fiber-based catalytic filter tube according to claim 11, wherein when adjusting the grouting pressure holding time, if an adjusted grouting pressure holding time Tz is greater than Tn, the Tn is used as an adjusted time; if the adjusted grouting pressure holding time Tz is less than T1, the T1 is used as the adjusted time;

when adjusting the grouting pressure, if an adjusted grouting pressure Pz is greater than Pn, the Pn is used as an adjusted grouting pressure; if the adjusted grouting pressure Pz is less than P1, the P1 is used as the adjusted grouting pressure; and when adjusting the suction pressure of the vacuum pump, if an adjusted suction pressure Kz of the vacuum pump is greater than Kn, the Kn is used as an adjusted suction pressure; if the adjusted suction pressure Kz of the vacuum pump is greater than K1, the K1 is used as the adjusted suction pressure.

14. The preparation method of a ceramic composite fiber-based catalytic filter tube according to claim 7, wherein in step S3, after the first electromagnetic valve provided above the pressure grouting port is controlled to close by the central control unit, when the vacuum pump is controlled to operate to ti/2 by the central control unit according to a determined suction pressure Ki, the ultrasonic thickness gauge that is arranged on the right side of the mold is received by the central control unit, to detect the thickness of the blank tube of the ceramic composite fiber-based filter tube; and the actual thickness of the blank tube is compared with the gap inside the mold by the central control unit; the thickness of the blank tube of the ceramic composite fiber-based filter tube is set as Hs, the gap inside the mold is set as H0, and a first reference value H1 of the thickness of the blank tube is set, if H0−Hs<H1 is satisfied, the suction pressure of the vacuum pump is determined by the central control unit to be Kz, satisfying Kz=1.05×Ki;

if H0−Hs=H1 is satisfied, the suction pressure of the vacuum pump is not adjusted by the central control unit; and if H0−Hs>H1 is satisfied, the suction pressure of the vacuum pump is adjusted by the central control unit to be Kz, satisfying Kz=0.95×Ki.

15. The preparation method of a ceramic composite fiber-based catalytic filter tube according to claim 8, wherein in step S3, after the first electromagnetic valve provided above the pressure grouting port is controlled to close by the central control unit, when the vacuum pump is controlled to operate to ti/2 by the central control unit according to a determined suction pressure Ki, the ultrasonic thickness gauge that is arranged on the right side of the mold is received by the central control unit, to detect the thickness of the blank tube of the ceramic composite fiber-based filter tube; and the actual thickness of the blank tube is compared with the gap inside the mold by the central control unit; the thickness of the blank tube of the ceramic composite fiber-based filter tube is set as Hs, the gap inside the mold is set as H0, and a first reference value H1 of the thickness of the blank tube is set, if H0−Hs<H1 is satisfied, the suction pressure of the vacuum pump is determined by the central control unit to be Kz, satisfying Kz=1.05×Ki;

if H0−Hs=H1 is satisfied, the suction pressure of the vacuum pump is not adjusted by the central control unit; and if H0−Hs>H1 is satisfied, the suction pressure of the vacuum pump is adjusted by the central control unit to be Kz, satisfying Kz=0.95×Ki.

16. The preparation method of a ceramic composite fiber-based catalytic filter tube according to claim 10, wherein when adjusting the grouting pressure, the grouting pressure determined for preparing the same type of the ceramic composite fiber-based filter tube next time is set to be Px, satisfying x=1, 2, 3, . . . , and n;

if A−A0≤A1 is satisfied, the grouting pressure for preparing the same type of the ceramic composite fiber-based filter tube next time is determined by the central control unit as Pz, satisfying Pz=1.05×Px; and if A0−A≤A1 is satisfied, the grouting pressure for preparing the same type of the ceramic composite fiber-based filter tube next time is determined by the central control unit as Pz, satisfying Pz=0.95×Px.

17. The preparation method of a ceramic composite fiber-based catalytic filter tube according to claim 12, wherein when adjusting the grouting pressure holding time, if an adjusted grouting pressure holding time Tz is greater than Tn, the Tn is used as an adjusted time; if the adjusted grouting pressure holding time Tz is less than T1, the T1 is used as the adjusted time;

when adjusting the grouting pressure, if an adjusted grouting pressure Pz is greater than Pn, the Pn is used as an adjusted grouting pressure; if the adjusted grouting pressure Pz is less than P1, the P1 is used as the adjusted grouting pressure; and when adjusting the suction pressure of the vacuum pump, if an adjusted suction pressure Kz of the vacuum pump is greater than Kn, the Kn is used as an adjusted suction pressure; if the adjusted suction pressure Kz of the vacuum pump is greater than K1, the K1 is used as the adjusted suction pressure.

* * * * *